(12) United States Patent
Crumm et al.

(10) Patent No.: US 6,749,799 B2
(45) Date of Patent: Jun. 15, 2004

(54) METHOD FOR PREPARATION OF SOLID STATE ELECTROCHEMICAL DEVICE

(75) Inventors: Aaron T. Crumm, Jackson, MI (US); John W. Halloran, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 215 days.

(21) Appl. No.: 10/074,125

(22) Filed: Feb. 12, 2002

(65) Prior Publication Data

US 2003/0151156 A1 Aug. 14, 2003

(51) Int. Cl.[7] ................................................. B28B 3/20
(52) U.S. Cl. ......................... 264/638; 264/104; 419/67
(58) Field of Search ................................. 264/638, 104, 264/171.1, 172.11, 172.15; 419/67

(56) References Cited

U.S. PATENT DOCUMENTS

| | | | |
|---|---|---|---|
| 3,402,230 A | * | 9/1968 | White, Jr. .................... 264/104 |
| 4,476,196 A | | 10/1984 | Poeppel et al. |
| 4,476,198 A | | 10/1984 | Ackerman et al. |
| 4,521,359 A | * | 6/1985 | Tsien ........................... 264/104 |
| 4,818,643 A | * | 4/1989 | Cook et al. .................. 429/188 |
| 4,913,982 A | | 4/1990 | Kotchick et al. |
| 5,013,619 A | * | 5/1991 | Cook et al. .................. 429/189 |
| 5,518,830 A | | 5/1996 | Worrell et al. |
| 5,645,781 A | | 7/1997 | Popovic et al. |
| 5,788,788 A | | 8/1998 | Minh |
| 5,827,620 A | | 10/1998 | Kendall |
| 2002/0146611 A1 | * | 10/2002 | Kawasaki et al. ............. 429/31 |

* cited by examiner

*Primary Examiner*—Christopher A. Fiorilla
(74) *Attorney, Agent, or Firm*—Robert Kelley Roth; Miller, Canfield, Paddock & Stone, PLC

(57) ABSTRACT

A method for preparation of a solid state electrochemical device having a cathode, and anode and an electrolyte positioned between the cathode and the anode is disclosed, comprising the steps of forming a controlled geometry feedrod having a cross sectional area, having at least a first extrusion compound and a second extrusion compound, and co-extruding the controlled geometry feedrod through a reduction die at least once to achieve a desired reduction in cross sectional area. Such microfabrication by thermoplastic co-extrusion enhances production of complex and multiphase electrodes and electrolytes.

29 Claims, 2 Drawing Sheets

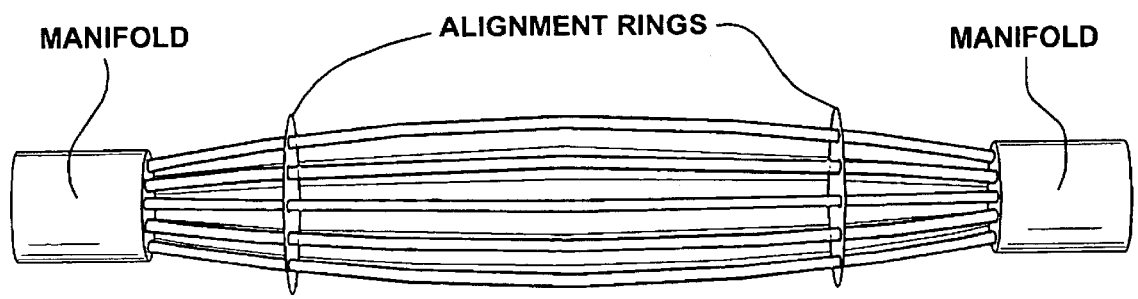
FIG - 3
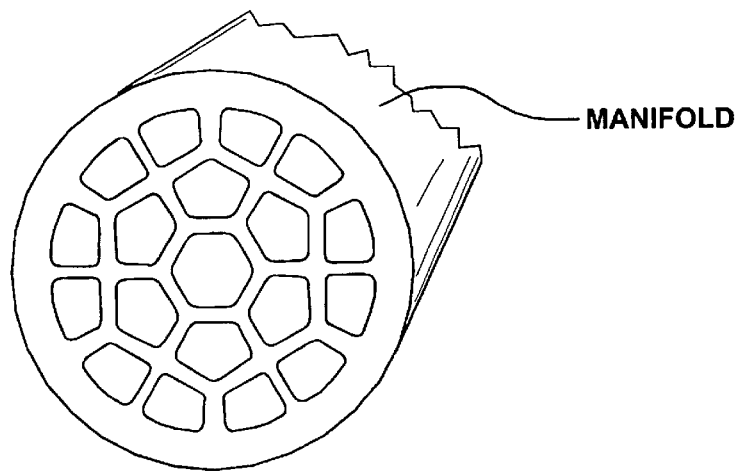
FIG - 4
FIG - 5
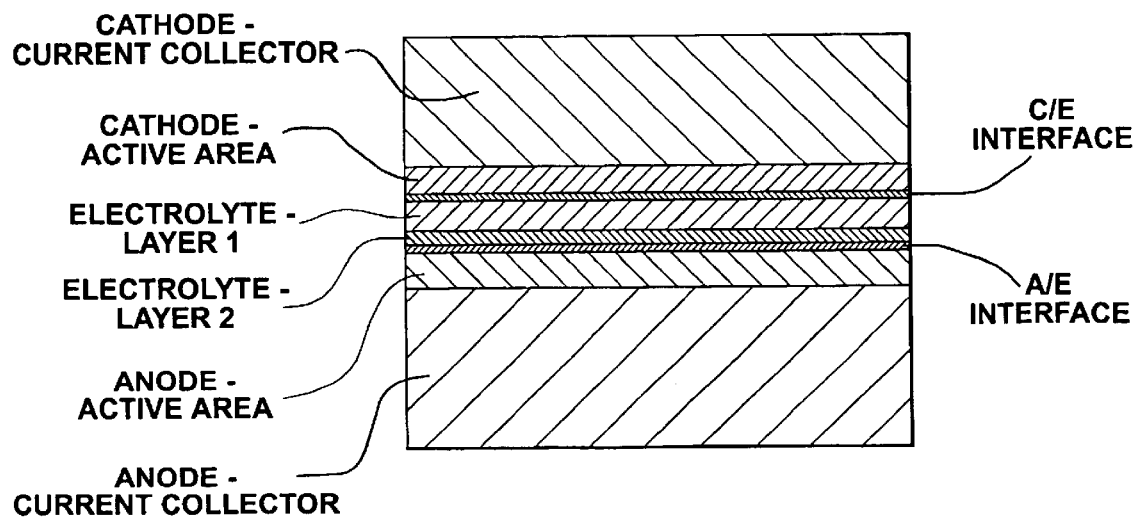

METHOD FOR PREPARATION OF SOLID STATE ELECTROCHEMICAL DEVICE

FIELD OF THE INVENTION

This invention relates to solid state electrochemical devices, methods of manufacturing thereof and applications for such devices, and more particularly, to apparatus and methods for preparing fuel cells.

BACKGROUND OF THE INVENTION

Solid state electrochemical devices can be used as oxygen generators, separation devices, electrochemical reactors, and fuel cells. In a solid oxide fuel cell, a solid oxide electrolyte is used in combination with a compatible anode and a cathode material. Such solid oxide fuel cells generate electricity and heat by directly converting the chemical energy of a fuel (hydrogen, hydrocarbons) with an oxidant ($O_2$, air) by means of an electrochemical process. Solid state electrochemical devices of the type addressed here make use of the property of certain solid state oxide electrolytes to support a current of oxygen anions, for example stabilized zirconia or related oxygen-ion conductors, which are effective at temperatures between 400 and 1000° C. In the case of a solid oxide fuel cell, the fuel and oxidant are separated by the electrolyte membrane, with the cathode side in contact with the oxidant, and the anode side in contact with the fuel. Oxygen from the oxidant stream is reduced to $O^{2-}$ anions at the cathode. These anions are transported through the solid electrolyte to the anode side of the cell. At the anode, the $O^{2-}$ ions are reacted with the fuel stream thus releasing electrons to flow back to the cathode. A secondary device can be inserted into the circuit between the anode and cathode to draw useful work from the flow of electrons generated.

The fuel cell reaction is governed by the availability of reactants at the electrodes, oxidant at the porous cathode and fuel at the porous anode. The reaction also requires that the electrolyte material have sufficient ionic conductivity, and that a sufficient amount of both the anode and cathode materials be linked together in continuous conduction paths to support the required electronic current demands. The microstructure of the porous anode and cathode electrode materials and their associated number of electrochemically active three phase boundaries ("TPBs") play an important role in governing the fuel cell electrode performance. Typically the conductivity of the electrolyte material increases with increasing operation temperature. Therefore, given a particular electrolyte material, the ohmic losses through the electrolyte membrane can only be reduced by either increasing the operating temperature of the cell or by reducing the thickness of the membrane.

Known solid oxide electrochemical devices all share the following features: 1) a manifold or area to introduce gases with high oxygen activity; 2) a manifold for gases at low oxygen activity; 3) an oxygen ion-conducting solid electrolyte separating the high oxygen activity gas from the low oxygen activity gas; 4) an electronically-conducting cathodic electrode to carry the cathode current; 5) an electronically-conducting anode electrode to carry the anode current; 6) a cathode-electrolyte-gas interface with high triple phase boundary (TPB) to enhance the electrochemical reaction rate; 7) an anode-lectrolyte-gas interface with high TPB. If a plurality of solid oxide fuel cell devices are connected in electrical series or in parallel, a suitable electrical interconnection may be required.

Known prior art for solid oxide fuel cells is reviewed well by Minh ("Fuel Cells", Journal of the American Ceramic Society, March 1993 76(3) p. 563–558), disclosing various designs, including tubular fuel cells, monolithic fuel cells and planar fuel cells. Kendall (U.S. Pat. No. 5,827,620) teaches the extrusion of thin-walled electrolyte tubes. Co-fired monolithic fuel cells offering high power per unit volume are taught by Akerman et al (U.S. Pat. No. 4,476, 198) and by Poeppel et al (U.S. Pat. No. 4,476,196). Kotchick et al (U.S. Pat. No. 4,913,982) and Minh (U.S. Pat. No. 5,788,788) teach the fabrication of monolithic fuel cells with a planar geometry by roll milling of unfired (or 'green') ceramic tapes made from separate anode, electrolyte, and cathode layers. The roll milling process produces multiple-material tapes with a reduced thickness. The green assembly of Mihn and Kotchick et al is sintered at one time, so the several materials are co-fired.

As zirconia and the materials commonly used for the electrodes in solid oxide fuel cells are ceramics, techniques for assembly of such electrochemical devices have been adapted from the ceramic arts. These techniques include green body forming and hydroplastic or "mud" processing where a solvent such as water is introduced to powders to prepare a mudlike mixture suitable for extrusion. The mixture is formed into the desired shape by forcing it through an extrusion die which defines the desired shape. After extrusion, the extruded body or "extrudate" is heated or otherwise dried to remove the solvent. The "mud" nomenclature is an apt description until the solvent is removed. Moreover, the solid oxide extrudate is brittle after removal of the solvent. Further, production times are slow and geometric configuration and other design freedom is limited.

Continuing in the tradition of using various ceramic based technologies to improve the manufacture of solid state electrochemical devices, it is known to describe co-extrusion of a solid oxide fuel cell, using several hydroplastic materials (a mud-like mixture including anode in solvent, electrolyte in solvent, and cathode in solvent) forced through separate cylinders and then through a coextrusion die. However, mud-like materials are difficult to process, and it can be difficult to control the cross sectional geometry of the resulting electrochemical cell since these processes use the step of coextrusion to determine the geometry.

Popovic et al (U.S. Pat. No. 5,645,781) teaches a thermoplastic co-extrusion technique to produce a certain type of textured ceramic composite for mechanical applications. The method of Popovic' et al. employs a controlled geometry feedrod having a macro-scale version of an arrangement of several ceramic powder-filled thermoplastic materials. The controlled geometry feedrod is forced through a heated die to produce finer diameter filament with a cross-section similar to the original feedrod. Popovic does not contemplate fabrication of electrochemical devices, nor does Popovic teach thermoplastic co-extrusion as a general technique of microfabrication for components suitable for solid oxide fuel cells.

The technique of microfabrication by thermoplastic co-extrusion (also referred to as "MFCX"), was recently developed and described by van Hoy et. al, "Microfabrication of Ceramics by Co-extrusion", Journal of the American Ceramic Society, January 1998, 81[1] p. 152–158); and by Crumm et al, "Fabrication of Microconfigured Multicomponent Ceramics", Journal of the American Ceramic Society, April 1998, 81[4] p. 1053–1057); which make reference to formation of piezoelectric and other electromechanical devices.

It is desirable to obtain an electrochemical cell with large areas where the electrochemical reaction can take place ("active areas") per volume and excellent performance made from an inexpensive process. There is an ongoing need for fuel cell designs and fabrication techniques that can achieve these goals. The present invention provides such an approach and related advantages.

SUMMARY OF THE INVENTION

In accordance with a first aspect, a method for preparation of a solid state electrochemical device having a cathode, and anode and an electrolyte positioned between the cathode and the anode comprises the steps of forming a controlled geometry feedrod having a cross sectional area, having at least a first extrusion compound and a second extrusion compound, and co-extruding the controlled geometry feedrod through a reduction die at least once to form an extrudate having a desired reduction in the cross sectional area. The extrudate may be subsequently formed to change its shape, and the electrodes may comprise more than one discrete region.

BRIEF DESCRIPTION OF THE DRAWINGS

FIG. 3 is an example of a cross sectional configuration of a solid state electrochemical device prepared in accordance with a preferred embodiment.

FIG. 4 shows an alternative preferred embodiment of a solid state electrochemical device prepared in accordance with a preferred embodiment.

FIG. 5 shows a preferred embodiment of a tubule bundle.

Figure 1:
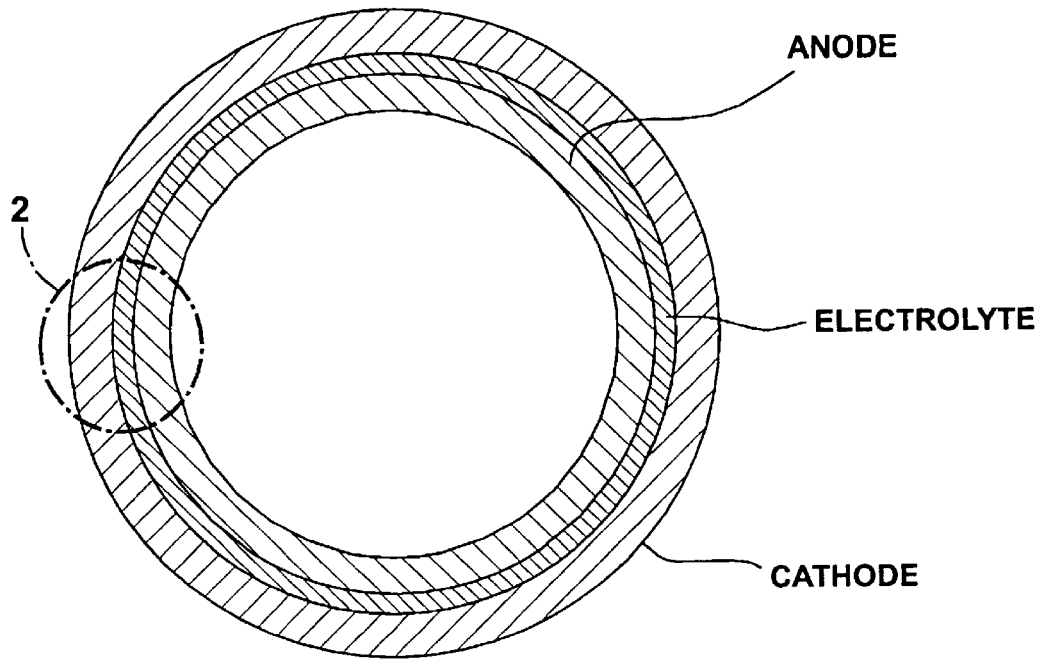
FIG. 1 is a solid state electrochemical device prepared in accordance with a preferred embodiment.

It should be understood that the appended drawings are not necessarily to scale, presenting a somewhat simplified representation of various preferred features illustrative of the basic principles of the invention. The specific design features of the solid state electrochemical device as disclosed here, including, for example, specific dimensions of the electrodes and electrolytes will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the solid state electrochemical device illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the method of preparing solid state electrochemical devices. The following detailed discussion of various alternative and preferred features and embodiments will illustrate the general principles of the invention with reference to a method for manufacturing a solid oxide fuel cell ("SOFC"). Other embodiments suitable for other applications will be apparent to those skilled in the art given the benefit of this disclosure.

The improved method discussed here is highly advantageous in the manufacture of electrochemical devices such as solid oxide fuel cells in that novel design features not possible with conventional ceramic processing methods may be incorporated into electrodes and electrolytes of fuel cells. Generally, the process for making such fuel cells consists of individually mixing one or more composition for the anode, cathode, electrolyte, and any other materials with a suitable binder system to form corresponding extrusion compounds. Next, these extrusion compounds are formed into a thermoplastic co-extrusion feedrod that has the same cross sectional ratios as the completed fuel cell. The feedrod is forced through a reduction die to change its cross-sectional dimensions while increasing its length. This step may be repeated as often as necessary to reduce the cross sectional area of the electrodes and electrolyte as much as desired. Sections of the extruded feedrod can be combined into an array of one or more different components ("bundled" together) for a secondary design. One or more of the extruded feedrod sections units can be joined together with other sections and mixed with a suitable binder system to form modules and sub-modules by assembling the units with green joining techniques accomplished by heat and pressure, by solvent joining, or other means readily apparent to those skilled in the art given the benefit of this disclosure. These modules and sub-modules can be plastically formed while in the green (unfired) state to create coils, twists, spirals, bends, or other suitable configurations to increase the performance of the fuel cell and its integration into the fuel cell power system. The fuel cell feedrods are fired at high temperature to create the desired fuel cell component. The process is sometimes referred to as microfabrication by thermoplastic co-extrusion.

The extrusion compounds are prepared by blending a fine powder, which can be a wide variety of materials discussed in greater detail below, with a thermoplastic polymer, and optionally one or more processing aids. Many thermoplastic polymer systems can be employed for the thermoplastic co-extrusion process, but preferred polymer systems are the ethylene polymers and copolymers, such as ethylene ethylacrylate, commercially available as DPDA-6182-NT made by Union Carbide. Processing aids reduce the viscosity of the polymer, aid dispersion of the powder, and act as a lubricant. Many of the oils, waxes, stearates or other fatty acids known in the plastics processing art could be used such as polyethylene glycol of molecular weight between 500 and 10,000 and mineral oil. It preferable that the rheological flow behavior of the several extrusion compounds be similar, (that is, within about 10% apparent viscosity) which can be accomplished through the judicious use of such processing aids, dispersants, surfactants or other agents known to affect Theological behavior.

A very wide variety of powder fillers may be used, affording a wide flexibility in the composition of the anodes, cathodes, electrolyte, interconnects, and channels for electrochemical devices. The particle size of the powders utilized in the thermoplastic co-extrusion process can include sizes from as fine as 10 nanometers to as coarse as 100 microns. The powders are mixed or compounded with the polymer binders and processing aids. To achieve desirable sintering behavior, filler loading is in the range of 40–75 volume percent, preferably above 50 volume percent.

The compounds are removed from the mixer and individually extruded, molded and machined to form any desired shape, such as small square rods, ribbons, or blocks, planar sheets or another geometry as required by the particular electrochemical cell design. These subsections are assembled to create a thermoplastic co-extrusion feedrod. A macroscopic version of the desired end product is assembled from a plurality of shaped assembly units prepared from the extrusion compounds. The extrusion compounds are bonded together in their final arrangement with heat, pressure, solvent, etc., to create a macroscopic feedrod, suitable for use in a piston extruder. The macroscopic feedrod can contain a large-scale version of the design, or a fraction of the design, or a multiple of the design. In accordance with a highly advantageous feature, the feedrod is a formed as a flexible plastic capable of holding its shape without the use of independent agents such as mold or die walls, unlike known mud processing techniques for manufacturing electrochemical devices. Further, the feedrod is malleable and can therefore be formed in a variety of complex shapes, if desired. The completed feedrod is then loaded into the extrusion cylinder of a suitable piston extrusion machine.

The feedrod is forced through a reduction die with the piston extruder by a suitable combination of heat and pressure. In accordance with another highly advantageous feature, the geometry of the feedrod is controlled. That is, the extrusion die creates the exterior shape and dimensions of the feedrod and imposes a particular reduction in the cross section of the material, so that the cross sectional dimensions are reduced by the reduction ratio of the die, without significant distortion of the design of the feedrod. Uniform reduction, for example with a square die with reduction ratio $R_1$, will create a controlled geometry feedrod where the cross-sectional dimensions of a square feedrod have been reduced by the factor $R_1$, and the feedrod is elongated axially by a factor about $R_1^2$. Non-uniform reduction, for example with a rectangular die of height H and width W, will reduce the height of the controlled geometry feedrod by a factor H and the width by a factor W. Practically any cross sectional geometry may be achieved, including round, oval, square, polygonal, flat, corrugated, festooned, and all other architectures that have a consistent cross section in the direction of extrusion.

Figure 2:
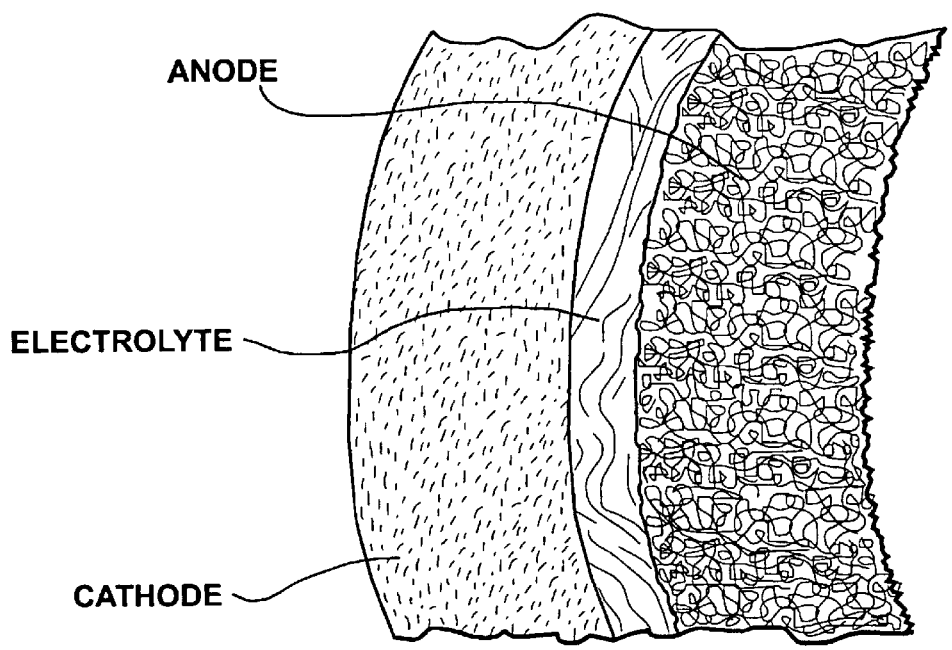
FIG. 2 is a close-up drawing showing cathode, electrolyte, and anode layers of a solid state electrochemical device prepared in accordance with a preferred embodiment.

For the cylindrical design shown in FIG. 2, the individual coextrusion compound materials (electrolyte, anodes and fugitive) were formed into a feedrod with a varying composition in the radial direction. The electrolyte material was pressed into half shell of material 500 microns thick and combined with a shell of anode green body compound 2.5 millimeters thick. These compositions were assembled at about 150 degrees Celsius and 10 MPa of pressure with a 16 millimeter cylinder of fugitive material to create a feedrod 22 millimeters in diameter with a continuous cylindrical shell of electrolyte material 500 microns thick, a continuous cylindrical shell of anode material 2.5 millimeters thick, and a central core of fugitive 16 millimeters in diameter. The cylindrical feedrod was then forced through a reducing die with a large reduction ratio to create an extruded composition of a diameter a fraction of its original size. Lengths of the green body extrudate were placed in a furnace and fired to remove the organic binders and fugitive powders and to sinter the precursor powders into the proper microstructure for solid oxide electrochemical cell operation.

After the desired number of reductions, the feedrod can be assembled into a final arrangement, and bonded with heat, pressure, solvent, etc. to make the desired green (unfired) object. In addition, the green object can be sliced, cut, drilled, or otherwise machined, as desired. The green bodies can be thermoplastically formed by heating to the softening temperature and arranging the body into the desired geometry. For example, long extruded rods can be advantageously bent into coils or similar shapes. Secondary thermoplastic forming of a co-extruded component in the green condition enables these objects to be twisted and bent and formed into coils, spirals, or similar structures commonly used to package lengths of tubular objects in compact spaces, as with trumpets, intestines, and tubular reactors. Incorporating tubular heat exchanger design features with the secondarily formed co-extruded tubes is particularly advantageous for the thermal management of hydrocarbon-fueled solid oxide fuel cells, which can involve endothermic reforming reactions, by supplying heat recovered from the exhaust streams or exothermic regions to the endothermic reforming regions.

The tubular designs illustrated by FIG. 3 could be joined with other tubular structures after the MFCX process, using the warm-forming ability of the thermoplastic in the "green" state to bring together a plurality of tubes and join them by warm welding or solvent bonding to that the create, after firing, a unitized multi-tubule object. FIG. 3 illustrates a plurality of thermoplastically co-extruded tubes joined on the left and the right in a common manifold with an alignment ring to guide the several sections and form a tubular bundle. FIG. 4 shows secondary structure for a manifold, which could be used for adjacent fuel reforming or as a heat exchanger. The tube array could usefully be contained in a suitable envelop, illustrated by the outer gray circle in FIG. 4. The envelop can form an encapsulating material which is gas permeable an electrically insulating, such as various foams and felts. Advantageously the mass of the assembly is low, so there is little inertia (for mechanical shock) and little thermal mass.

The controlled geometry feedrod serves as a ceramic green body. The polymer and organic processing aids can be removed by one of several known techniques, such as "binder burnout". In this technique, the co-extruded controlled article is slow baked to about 500° C., with a heating schedule determined by the characteristics of the polymer, the powder, and the geometry of the molded article. Fugitive materials may also be used, which is subsequently removed after thermoplastic co-extrusion to create empty space in the fired object as in the annular or tubular embodiments shown in FIG. 2. The fugitive material leaves empty space and may also create open porosity in the electrodes as well as fuel and oxidant channels and manifolds.

The preferred method disclosed herein permits components of the electrochemical device to be assembled in any combination of anode, cathode, electrolyte and ancillary materials. Any of these components not assembled by thermoplastic co-extrusion processing may be added in a subsequent step. Moreover, it is also possible to vary the electrode composition and geometry in a manner to decrease the electrode overpotential losses, such as introducing porosity and composition gradients outward from the electrolyte-electrode interface so as to increase the triple point boundary length available for electrochemical reaction near the electrolyte-electrode interface while simultaneously maximizing reactant diffusion and electrical conductivity in the electrode bulk.

In one example of a fuel cell where the cathode, anode and electrolyte are all formed from a single material incorporated into the extrusion compound, such as those seen in FIGS. 2–3, the anode material is metallic nickel (Ni), as a cermet of Ni, with yttria stabilize zirconia. The cathode material is lanthanum strontium manganate, or lanthanum strontium cobaltite-ferrite cathode or another conductive material stable under oxidizing conditions. The oxygen-conducting electrolyte is an oxygen conducting oxide such as, for example, a fluorite structured oxide or a stabilized zirconia such as yttria-stabilized zirconia (YSZ), in particular a composition with 8 mole percent yttria (8Y-yttria stabilized zirconia). Ceria may also be used for the electrolyte. These ceramic compounds for the anode, cathode and electrolyte can be prepared separately in a suitable high shear mixer at about 125° C. For this example, the zirconium oxide compound, the lanthanum strontium manganate oxide compound, a carbon black fugitive compound and the nickel oxide compound can have an apparent viscosity of about 15,000 poise at 125° C. The electrolyte green body material or extrusion compounds would be mixed from 85.9 weight percent of 8 mole % yttria stabilized zirconia powder (Tosoh TZ-8Y), 7.2 weight percent of polyethylene polymer (Union Carbide grade DPDA 6182), 5.3 weight percent of acrylate polymer (Rohm & Haas grade B67), 1.0 weight percent of stearic acid (alfa aesar stearic acid), and 0.3 weight percent of heavy mineral oil (alfa aesar HMO), 0.3 weight percent of polyethylene glycol of a molecular weight of 1000 grams per mole. The anode green body material would be mixed from 42.2 weight percent of nickel oxide (NiO) powder (such as Alfa Aesar nickel II oxide), 36.4 weight percent of 8 mole % yttria stabilized zirconia powder (Tosoh TZ-8Y), 6.0 weight percent of carbon fugitive pore former (Cabot BP120), 7.2 weight percent of polyethylene polymer (Union Carbide grade DPDA 6182), 5.3 weight percent of acrylate polymer (Rohm & Haas grade B67), 1.0 weight percent of stearic acid (alfa aesar stearic acid), 0.3 weight percent of heavy mineral oil (alfa aesar HMO), and 0.3 weight percent of polyethylene glycol of a molecular weight of 1000 grams per mole. The fugitive green body material would be mixed from 25.2 weight percent of carbon black (Cabot grade BP 50), 7.5 weight percent of polyethylene polymer (Union Carbide grade DPDA 6182), 5.5 weight percent of acrylate polymer (Rohm & Haas grade B67), 1.0 weight percent of stearic acid (alfa aesar stearic acid), 0.3 weight percent of heavy mineral oil (alfa aesar HMO), and 0.3 weight percent of polyethylene glycol of a molecular weight of 1000 grams per mole.

Other possible compositions for a single component solid oxide fuel cell where the anode, electrolyte, and cathode are all fluorite-structured zirconia solid solutions. In these applications the anode comprises n-type conducting yttrium zirconium titanium oxide compositions, the electrolyte comprises substantially ionic conducting yttrium zirconium oxide compositions, and the cathode comprises certain p-type yttrium zirconium terbium oxide compositions.

Ancillary materials may also be added to the thermoplastic compound used in the microfabrication by co-extrusion process. The process permits any of a multitude of additional powders not directly related to fuel cell operation to be introduced. Ancillary materials could be included for current collection, electrical interconnection, mechanical reinforcement, reforming catalysts, and additional constructs used to enhance and support the operation of the cell.

With the process disclosed herein, the electrolyte layer can be formed as thin as 5 microns, if desired. The electrolyte material can be configured to accentuate the mechanical strength of the electrochemical cell through the use of reinforcing ribs and secondary structures such as a corrugated configuration that do not greatly detract from cell operation.

This new process for formation of electrochemical devices can produce designs to enhance internal reforming of electrodes by incorporating features to promote reforming reactions. These can include variations in pore size, connectivity, shape, and surface area as well as the relative amount of Ni, the presence of metal or oxide catalysts, etc. The designs and composition of the internal reforming region of the anode can be different, if desired, from the designs and compositions of the TPB region of the anode-electrolyte interface. Also, this process can produce designs that minimize anode or cathode polarization with a large TPB, by the use of fine scale yttria stabilized zirconia dispersoids and fine porosity in the electrode area adjacent to the electrode-electrolyte interface. Anode concentration polarization may optionally be further minimized by designing the gas transport path from the fuel source to the near-interface area to include straight channels with low tortuosity. This offers an improvement over random porosity, which wastes some of the pore volume with dead ends and tight passages.

In addition, microfabrication by thermal co-extrusion can produce electrochemical devices with reduced anode transverse resistance by arranging an area with an electronically conductive electrode phase to act as a more efficient current collector. This is achieved by manipulating the local volume fractions and compositions of electrode and electrolyte materials in a manner to reduce electrode ohmic resistance by grading the microstructure and phase assemblage between the electrolyte interface (forming an electrochemically active area where electrocatalysis is critical to increase exchange current density) to the current collector (where ohmic resistivity needs to be reduced). The electrode and yttria stabilized zirconia phases may be placed in specific locations, leading to a current bus in each cell, to minimize the ohmic resistance of the electrode.

It is also possible to modify the composition of the electrolyte layer. For example, it is possible to make a first part of the electrolyte layer from a lower resistance material which may have partial electronic conductivity at the normal solid oxide fuel cell operating conditions, and a second part of the electrolyte layer from a materials such as 8% yttria stabilized zirconia, which has higher resistivity, but has substantially complete ionic conduction. The thin layer of 8% yttria stabilized zirconia would block the electronic current, but pass the ionic current.

The MFCX technique makes it possible to achieve separate optimization of microstructure for high TPB and low resistance in both the anode and cathode materials. A high volume fraction of large pores will increase the permeability of the electrodes to gas, which will decrease concentration polarization, and in turn decrease polarization losses. Permeability improves with higher porosity, increasing roughly with the cube of the volume fraction porosity. However, porosity will increase the resistance of the electrode, increasing ohmic losses being roughly in proportion to the volume fraction porosity. In the known designs, one seeks a single pore size distribution and pore volume fraction which is a compromise between the improvement in permeability and the increase in ohmic losses. With the great design flexibility of micro-fabrication by thermoplastic co-extrusion one can have non-homogenous porosity of electrodes which reduces electrical resistance and gas-phase transport resistance. For example, a mechanically robust yttria stabilized zirconia frame can support a thin yttria stabilized zirconia electrolyte membranes. The frame could be made from a lower cost, stronger composition material (e.g., 3% yttria), while the membrane could be of a higher conductivity composition (e.g., 8% yttria).

FIG. 5 shows an example of a more complex fuel cell showing some of the various alternative features which may be incorporated into an electrochemical device in accordance with a preferred embodiment of the method disclosed herein. The cathode, anode and electrolytes are all formed as bilayers, and an intermediate layer is positioned between both the cathode and the electrolyte and the anode and the electrolyte. The cathode has a distinct layers with a gradient in the pore structure, so that fine pores offering high TPB are present near the electrolyte interface, and coarse pores in areas of the cathode remote from the electrolyte interface, thereby achieving a low radial pneumatic resistance. (Optionally, a design with radial fins also permits easier radial gas transport without impeding axial electric current.) The cathode/electrolyte intermediate layer and the anode/electrolyte can comprise, for example a thin barrier layer of a cerium oxide compound. The electrolyte layers can comprise, for example, a thin YSZ layer on or within a cerate electrolyte. The YSZ layer will have an electronic transferance number that is essentially zero. Thus it will block the undesirable electronic current while passing the desired ionic current. Finally, the layer of the anode remote from the electrolyte can replace the YSZ filler with a smaller volume fraction of a lower expansion filler, such as aluminum oxide. The other layer can comprise a nickel cermet with a YSZ filler as discussed above.

It is advantageous to produce fuel cells with a thin electrolyte supported on a porous anode as shown in FIG. 3. It will be readily apparent to those skilled in the art given the benefit of this disclosure that such designs can be inverted, with inner cathode and outer anode, for situations where fuel is outside the tube and an oxidant is inside the tube. As above, single-stage or multiple stage reduction dies can be used to achieve the desired tube outer diameter, inner diameter, and electrolyte thickness one application for coextruded electrochemical devices are small tubular cells for a portable solid oxide fuel cell to generate electrical power from hydrocarbon fuels.

Fuel cells incorporating portable SOFC generators as discussed herein are advantageous replacements for disposable and rechargeable batteries for a wide variety of portable electronics and electrical equipment, since a hydrocarbon fuel has much higher energy density than a battery. Also, portable SOFC made by coextrusion are advantageous battery replacements for electronic equipment carried by military personnel. Similarly, electronic or electrical equipment used in outdoors activities such as hiking and camping could be powered by SOFC generators. Cordless electrical hand tools, now powered by batteries, could be improved by use of portable SOFC generators using hydrocarbon fuels. Stationary power generation in the kilowatt range could be achieved advantageously by the use of many coextruded SOFC tubes, and could be applied for distributed electric power generation.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for preparation of a solid state electrochemical device having a cathode, an anode and an electrolyte positioned between the cathode and the anode, comprising in combination, the steps of:

forming a controlled geometry feedrod having a cross sectional area, comprising at least a first extrusion compound and a second extrusion compound; and co-extruding the controlled geometry feedrod through a reduction die at least once to create a co-extruded article having a desired reduction in the cross sectional area.

2. The method according to claim 1 wherein the first extrusion compound comprises one of a first ceramic and a metal powder filled thermoplastic, and the second extrusion compound comprises one of a second ceramic and a second metal powder filled thermoplastic.

3. The method according to claim 1 wherein the electrolyte is formed as part of the controlled geometry feedrod and the cathode and the anode are formed in subsequent steps.

4. The method according to claim 1 wherein the electrolyte and one of the cathode and the anode are formed as part of the controlled geometry feedrod and the other of the cathode and the anode is formed in a subsequent step.

5. The method according to claim 1 further comprising adding at least one ancillary material to the controlled geometry feedrod.

6. The method of according to claim 5 wherein the ancillary material comprises at least one of:

a rigidity enhancing material;

a current collector;

an electrical interconnection material to enhance electrical communication of the solid state electrochemical device; and a reforming catalyst.

7. The method according to claim 1 further comprising the step of matching rheological behavior of the first and second extrusion compounds with a high shear mixer.

8. The method according to claim 1 further comprising heating the die as the feedrod is reduced.

9. The method according to claim 1 further comprising sintering the co-extruded article after the controlled geometry feedrod has passed through the reduction die.

10. The method according to claim 1 wherein the first extrusion compound and the second extrusion compound comprise an extrudable thermoplastic carrier material.

11. The method according to claim 1 wherein the anode comprises a material with nickel.

12. The method according to claim 1 wherein the anode comprises a first material forming an electrochemically active area, and a second material forming a current collector.

13. The method according to claim 1 wherein the cathode comprises a conductive material stable under oxidizing conditions.

14. The method according to claim 1 further comprising the steps of:

co-extruding a fugitive material as part of the controlled geometry feedrod; and forming at least one projection in the co-extruded article by removing the fugitive material.

15. The method according to claim 1 wherein the electrolyte comprises an oxygen ion conducting oxide.

16. The method of claim 1 wherein the first compound and the second compound comprise a thermoplastic polymer binder, and the co-extruded article is heated to remove the polymer binder and form at least the electrolyte.

17. The method of claim 1 further comprising the steps of:

co-extruding a fugitive material as part of the controlled geometry feedrod; and forming a series of passageways in the co-extruded article by removing the fugitive material with heat.

18. The method of claim 1 further comprising the step forming the anode with at least first and second distinct regions having at least one of a different pore volume, size, shape, connectivity, catalyst materials, and electrical conductors.

19. The method of claim 1 further comprising the step forming the cathode with at least first and second distinct regions having at least one of a different pore volume, size, shape, connectivity, catalyst materials, and electrical conductors.

20. A method for preparation of a solid state electrochemical device having a cathode, and anode and an electrolyte positioned between the cathode and the anode, comprising in combination, the steps of:

forming a feedrod having a cross sectional area, comprising at least a first extrusion compound and a second extrusion compound, wherein the feedrod holds its shape upon forming; and co-extruding the feedrod through a reduction die at least once to produce a co-extruded article having a desired reduction in the cross sectional area.

21. The method according to claim 20 wherein the solid state electrochemical device is formed in the shape of a tube.

22. The method according to claim 20 wherein as the cross sectional area of the feedrod decreases and the feedrod is elongated as it is co-extruded.

23. A method for preparation of a solid state electrochemical device having a cathode, and anode and an electrolyte positioned between the cathode and the anode, comprising in combination, the steps of:

forming a feedrod by:

molding a fugitive material;

molding an anode around the fugitive material;

molding an electrolyte around the anode; and molding a cathode around the electrolyte; and co-extruding the feedrod through a reduction die at least once to achieve a desired reduction in the cross sectional area of the feedrod, thereby producing a co-extruded article.

24. The method according to claim 23 further comprising the step of heating the feedrod to remove the fugitive, so that the co-extruded article has a tube-shaped structure.

25. The method according to claim 23 further comprising the steps of:

forming a series of feedrod sections having ends; and forming a manifold around the ends to form a tubular bundle.

26. The method according to claim 25 further comprising the step of enveloping the tubular bundle in a gas permeable material.

27. The method according to claim 26 wherein the gas permeable material is made from one of a non-electronically conducting ceramic fiber and a non-electronically conducting open cell ceramic foam.

28. The method according to claim 23 wherein the cathode and the anode each comprise electron conducting materials and ion conducting materials.

29. A method for preparation of a solid state electrochemical device having a cathode, and anode and an electrolyte positioned between the cathode and the anode, comprising in combination, the steps of:

forming a feedrod having a cross sectional area, wherein at least one of the cathode and the anode is formed as a powder filled polymer having at least first and second regions, with the first region comprising an active area and the second region comprising a current collector; and co-extruding the controlled through a reduction die at least once to achieve a desired reduction in the cross sectional area of the feedrod.

* * * * *

UNITED STATES PATENT AND TRADEMARK OFFICE
CERTIFICATE OF CORRECTION

PATENT NO. : 6,749,799 B2  
APPLICATION NO. : 10/074125  
DATED : June 15, 2004  
INVENTOR(S) : Aaron Crumm et al.

Page 1 of 1

It is certified that error appears in the above-identified patent and that said Letters Patent is hereby corrected as shown below:

Column 2, line 3, replace "558" with --588--

Column 4, line 44, afer "it" insert --is--

Column 4, line 49, replace "theological" with --rheological--

Column 5, line 7, after "is" delete "a"

Column 6, line 14, after "to" delete "that the"

Column 6, line 24, replace "an" with --and--

Column 6, line 59, replace "stabilize" with --stabilized--

Column 8, line 32, replace "materials" with --material--

Column 8, line 56, replace "membranes" with --membrane--

Column 8, line 67, replace "layers" with --layer--

Column 10, line 20, delete "of"

Column 12, line 33, after "controlled" insert --geometry--

Signed and Sealed this

Twenty-second Day of May, 2007

JON W. DUDAS  
*Director of the United States Patent and Trademark Office*